United States Patent

Morris

[15] 3,646,543
[45] Feb. 29, 1972

[54] SENSING ASSEMBLY
[72] Inventor: Harold D. Morris, Orinda, Calif.
[73] Assignee: Systron-Donner Corporation, Concord, Calif.
[22] Filed: Feb. 4, 1969
[21] Appl. No.: 796,378

[52] U.S. Cl. ................................... 340/262, 335/2
[51] Int. Cl. ......................................... G08b 21/00
[58] Field of Search ................. 340/262; 335/1, 2, 172

[56] References Cited

UNITED STATES PATENTS

| | | | |
|---|---|---|---|
| 2,980,776 | 4/1961 | Ovshinsky | 335/2 X |
| 3,109,145 | 10/1963 | Morris et al. | 340/262 X |
| 3,123,801 | 3/1964 | Bosler | 340/262 X |
| 3,332,060 | 7/1967 | Liljequist | 340/262 X |

Primary Examiner—John W. Caldwell
Assistant Examiner—Michael Slobasky
Attorney—Flehr, Hohback, Test, Albritton & Herbert

[57] ABSTRACT

Sensing assembly having a housing with a cavity therein and a movable mass disposed in the cavity in the housing and means normally yieldably urging said movable mass into a predetermined position in the housing and also having electronic means for sensing the position of the movable mass in the housing.

15 Claims, 8 Drawing Figures

INVENTOR.
Harold D. Morris
BY Flehr, Hohbach, Test,
Albritton & Herbert
Attorneys INVENTOR.
Harold D. Morris
BY Flehr, Hohbach, Test,
Albritton & Herbert
Attorneys

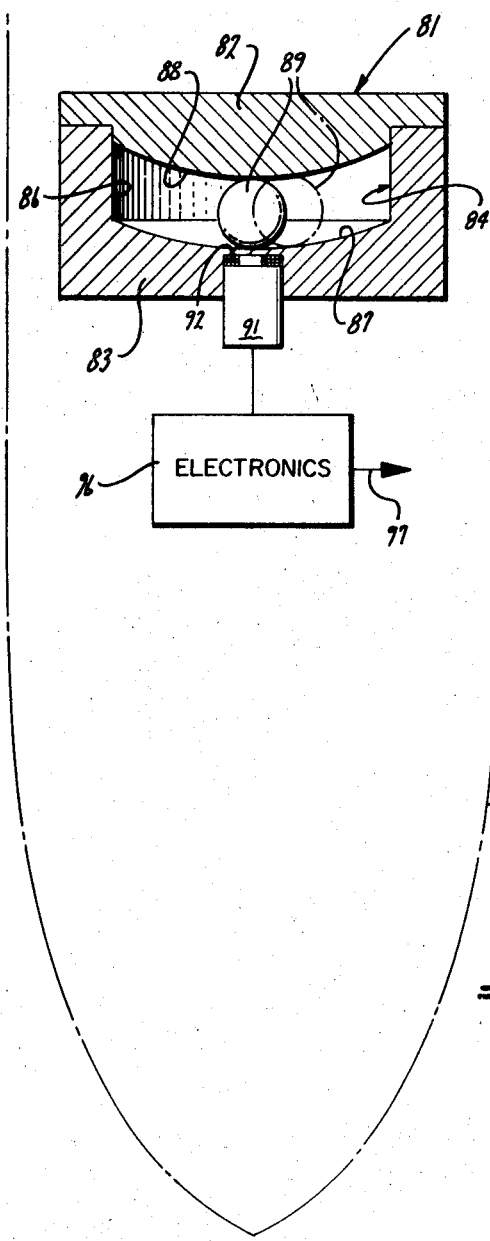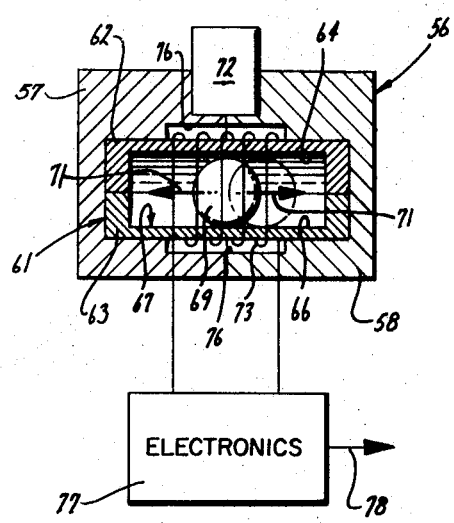
Fig. 7
Fig. 8

3,646,543

SENSING ASSEMBLY

BACKGROUND OF THE INVENTION

Sensing assemblies have heretofore been provided. However, such sensing assemblies have generally been relatively expensive or they have been relatively inaccurate so that it was not feasible to use them in many possible applications. There is, therefore, a need for a new and improved sensing assembly.

SUMMARY OF THE INVENTION AND OBJECTS

The sensing assembly comprises a housing having a cavity therein. A movable mass is disposed in the cavity in the housing. Means is provided for normally yieldably urging the movable mass into a predetermined position in said housing. Electronic means is also provided for sensing the position of the movable mass in the housing.

In general, it is an object of the present invention to provide a sensing assembly which is relatively simple to construct and which is relatively inexpensive.

Another object of the invention is to provide a sensing assembly of the above character which has a response which is independent of temperature.

Another object of the invention is to provide a sensing assembly of the above character which is substantially insensitive to shock and vibration.

Another object of the invention is to provide a sensing assembly of the above character which has high reliability.

Another object of the invention is to provide a sensing assembly of the above character which avoids use of switch contacts.

Another object of the invention is to provide a sensing assembly of the above character which has only one moving part.

Another object of the invention is to provide a sensing assembly of the above character which has a time delay.

Another object of the invention is to provide a sensing assembly of the above character which can be utilized as a nonpolarity sensing acceleration switch.

Another object of the invention is to provide a sensing assembly of the above character which can be utilized as a tilt sensor.

Additional objects and features of the invention will appear from the following description in which the preferred embodiments are set forth in detail in conjunction with the accompanying drawings.

BRIEF DESCRIPTION OF THE DRAWING

FIG. 7 is a cross-sectional view showing a sensing assembly incorporating another embodiment of the invention.

FIG. 8 is a cross-sectional view of a sensing assembly incorporating still another embodiment of the present invention.

DESCRIPTION OF THE INVENTION

Figure 1:
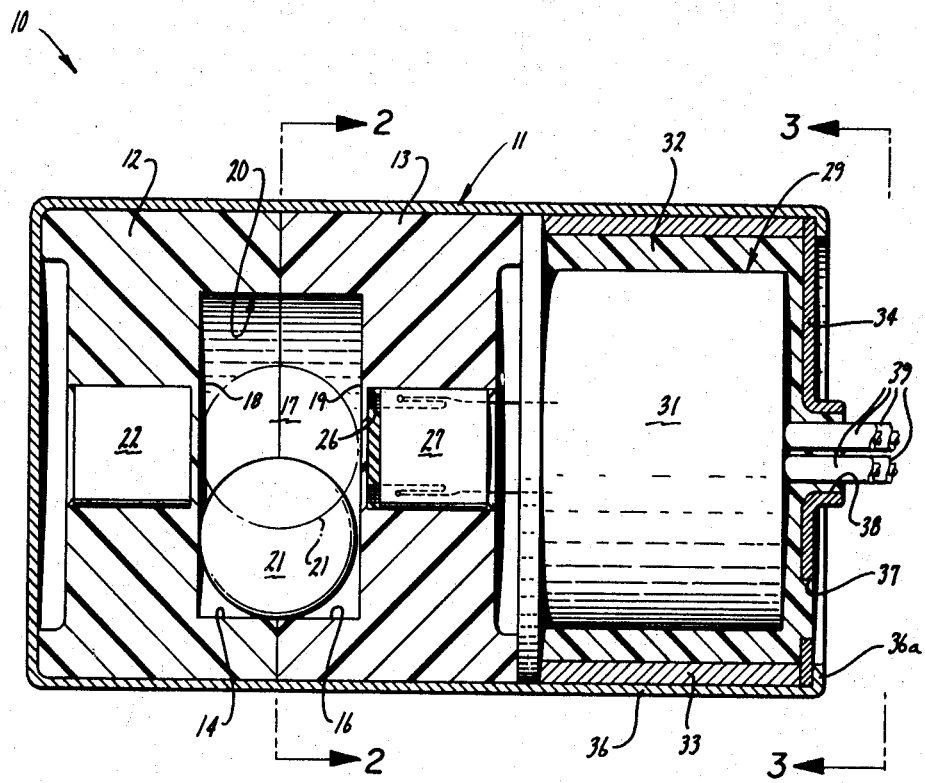
FIG. 1 is a cross-sectional view of a sensing assembly incorporating the present invention.
Figure 2:
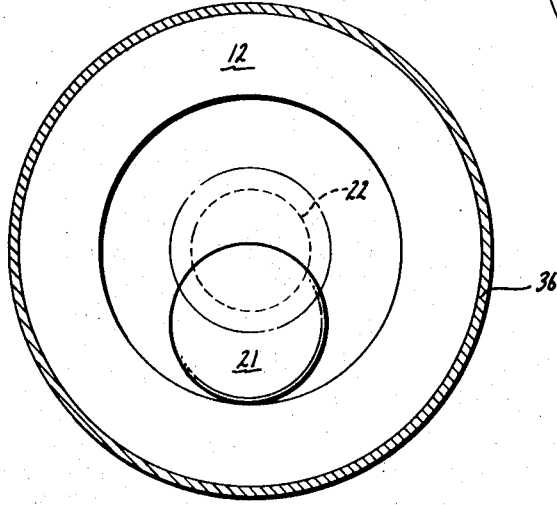
FIG. 2 is a cross-sectional view taken along the line 2—2 of FIG. 1.
Figure 3:
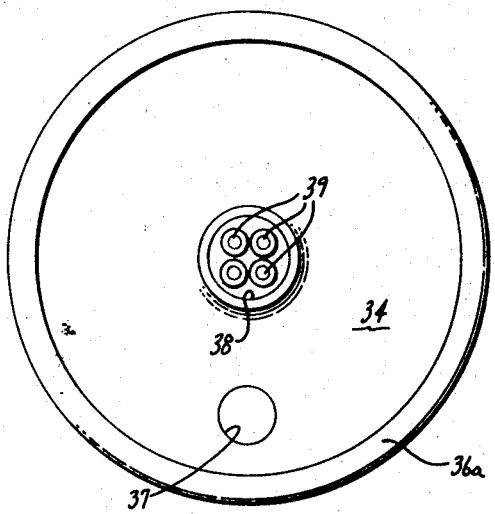
FIG. 3 is an end elevational view looking along the line 3—3 of FIG. 1.

The sensing assembly 10 shown in FIGS. 1–4 consists of a housing 11 which is formed in two parts, parts 12 and 13. The parts 12 and 13 can be formed of any suitable nonmagnetic material such as glass-filled Diall. The two parts 12 and 13 are identical and are provided with cylindrical recesses 14 and 16. The two recesses 14 and 16 face each other to provide a cavity 17 having spaced parallel end surfaces 18 and 19 and an annular side wall 20. The cavity 17 is in the form of a right circular cylinder which has a diameter substantially greater than its length.

A mass 21 formed of a material having suitable magnet properties, such as iron, steel, alloys and other compositions, is disposed within the cavity 17. The mass 21 is preferably balllike; however, this is not absolutely essential because, for example, in certain applications it could be in the form of a cylinder. The mass 21 and the cavity 17 are dimensioned so that the mass 21 can roll around in the cavity much like in a pillbox. The end surfaces 18 and 19 are spaced apart a distance which is only slightly greater than the diameter of the mass. The cavity 17 should have a diameter which is substantially greater than the diameter of the mass so that the mass can assume a position which is substantially removed from the central or longitudinal axis of the cavity which is aligned with the axis of the housing 11.

Means is provided for normally yieldably urging the mass into a predetermined position within the cavity 17 in the housing 11 and consists of a cylindrical permanent magnet 22, formed of a suitable material such as Alnico, which has its axis in axial alignment with the longitudinal axis of the housing 11. The permanent magnet 22 creates a magnetic field which attracts or tends to roll the mass 21 towards the center of the cavity 17. The magnetic field created by the magnet 22 is insufficient to shift the mass 21 when the pull of gravity is at right angles to the longitudinal axis of the magnet 22. It is, however, as hereinafter pointed out, strong enough to attract the mass to the center when the force of gravity is generally parallel to the longitudinal axis of the magnet 22.

Electronic means is provided for sensing the position of the mass 21 within the cavity 17 and consists of a pancake type pickoff coil 26 which is carried by the end of a cylindrical pickoff block 27 mounted within the part 13 of the housing in alignment with the axis of the housing. As shown, the pickoff coil 26 is directly opposite the permanent magnet 22 and is provided with leads which are connected to an electronics module 29. The circuitry of the module 29 is packaged in an inner case 31 which is disposed in a potting compound 32. The case 31 is also included within a cylindrical sleeve 33 and an end plate 34. All of these parts as well as the housing 11 and the mass 21 are disposed within an outer case 36 which has its lower extremity 36a crimped over the end plate 34 to provide a compact unitary assembly which is relatively small in size and light in weight. The end plate 34 is provided with a hole 37 for receiving the potting compound. The end plate 34 is also provided with an opening 38 through which the leads 39 extend into and from the electronics module 29.

Figure 4:
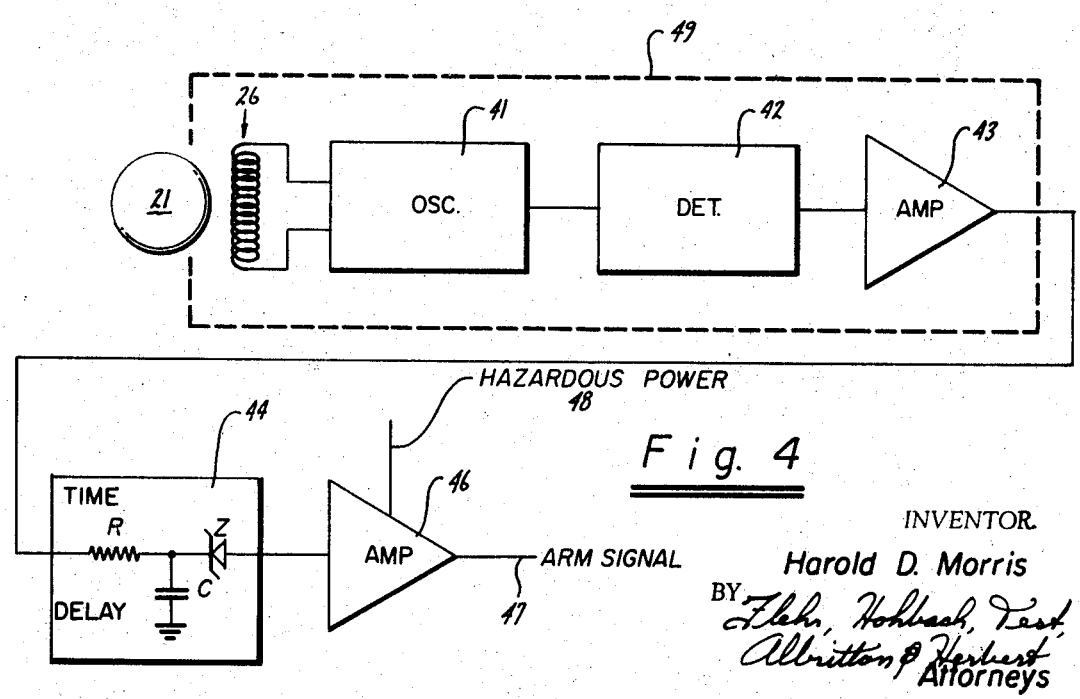
FIG. 4 is a block diagram of the electronics utilized in connection with the sensing assembly.

The electronics module 29 contains the circuitry which is shown in block diagram form in FIG. 4. The electronics is very similar to that disclosed in U.S. Pat. Nos. 3,074,279 and 3,057,195, and includes an oscillator 41 which is connected to the pickoff coil and which supplies its output to a detector 42. The rectified output of the detector 42 is supplied to an amplifier 43 and the output of the amplifier is connected to a time delay unit 44. The time delay unit includes a resistor R connected in series with a Zener diode Z. A capacitor C connects the junction of the resistor and the Zener diode to ground. The output of the time delay unit is connected to an amplifier 46 which produces an output 47 that can be utilized as an "arm" signal as hereinafter described. The amplifier 46 is energized on line 48 from a hazardous power supply, i.e., one which is used to fire squibs. The blocks of the circuit diagram in FIG. 4 within the dotted line rectangle 49 can be substantially identical to corresponding blocks described in U.S. Pat. No. 3,074,279.

Figure 5:
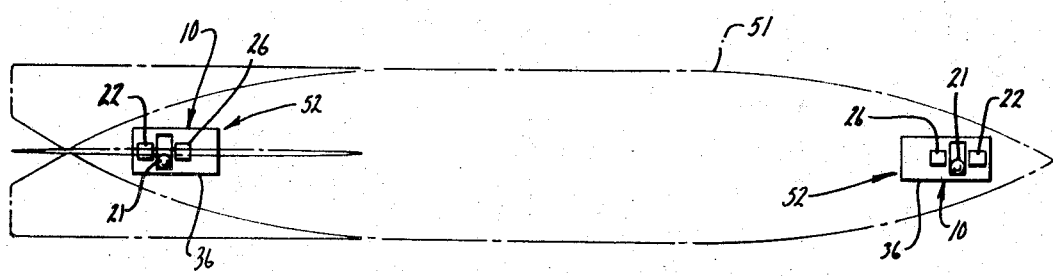
FIG. 5 shows the use of the sensing assembly in connection with a bomb.

To describe the operation of the sensing assembly shown in FIGS. 1–4, let it be assumed that the sensing assembly 10 has been mounted in a bomb 51. A safe-arm package 52 is mounted in the tail of the bomb and also in the nose of the bomb as shown generally in FIG. 5. Each of the safe-arm packages 52 includes a sensing assembly 10 of the type shown in FIGS. 1–4. The sensing assemblies are aligned so their longitudinal axes are coincident or parallel to the longitudinal axis of the bomb 51 as shown in FIG. 5. When the bomb is in a horizontal position, the mass 21 would be at the bottom of the cylindrical cavity 17 as shown. Two of the packages 52 are provided in the bomb 51 to provide parallel redundancy.

Figure 6:
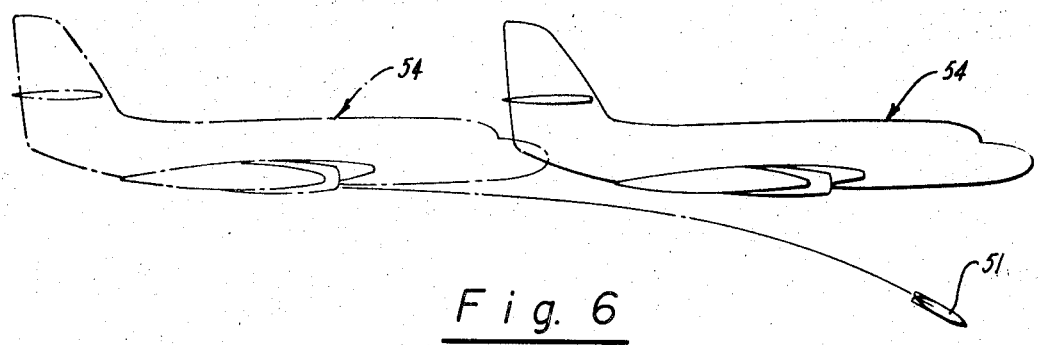
FIG. 6 is an illustration showing the manner in which a bomb is dropped from a plane.

Now let it be assumed that the bomb 51 is in a horizontal position as it would be in the bomb rack of an airplane, such as the airplane 54 shown in FIG. 6. It can be seen that when the sensing assemblies 10 are in these positions, the masses 21 would be at the bottom of the cylindrical cavities 17. When a sensing assembly 10 is in this position, the force created by the permanent magnet 22 is insufficient to bring the mass back to a position in which it is centered within the cavity 17. The pickoff coil 26 senses the absence of the mass 21 because the mass is at a maximum distance from the pickoff coil as well as at a maximum distance from the magnet 22. This means that the mass 21 would have little influence on the pickoff coil; therefore, the oscillator 41 operates vigorously. The output of the oscillator is rectified by the detector 42 and is supplied to the amplifier 43. The amplifier 43 is of the inverting type and, therefore, the output of the amplifier is cut off when it receives the signal from the detector 42 and thus, in effect, an inhibit signal would be supplied to the time delay unit 44 and to the amplifier 46 so that an "arm" signal would not be supplied by the amplifier 46.

Therefore, it can be seen that when the bomb 51 and the sensing assemblies 10 carried thereby are in positions in which their longitudinal axes are substantially horizontal, no "arm" signal can be supplied by the sensing assemblies 10. This is true even though there is acceleration along an axis parallel to the longitudinal axis of the sensing assemblies 10 and the bomb. Thus, if the bomb were loaded on a plane and the plane took off or landed, the forces of acceleration or deceleration would have no effect on the output because these acceleration forces acting upon the ball-like mass 21 would be incapable of translating or moving the ball-like mass because the ball-like mass is in relatively close proximity to the surfaces 18 and 19 of the cylindrical cavity and can move only very slightly in a direction which is parallel to the longitudinal axis of the sensing assembly.

If effect, it can be seen that the sensing assembly 10 shown in FIGS. 1–4 is omni-directional at right angles to the longitudinal axis of the sensing assembly. Thus, no matter how the sensing assembly is rotated or the bomb 51 in which it may be mounted is rotated, the ball-like mass 21 will always be pulled by the force of gravity to a lowermost position within the cavity 17 which is the maximum distance from the pickoff coil 26. This is true because at all times the force of gravity which can be considered as 1G is exerting force on the ball-like mass 21 which is at right angles or cross-axis to the longitudinal axis of the sensing assembly and of the bomb 51. Thus, as long as this force of gravity of 1G is present, the ball-like mass 21 will remain against the outer sidewall 20 of the cylindrical cavity 17 and no arming signal will be produced.

Now let it be assumed that the bomb has been dropped as shown in FIG. 6. The force of 1G on the ball-like mass 21 will disappear because the bomb 51 would move into free fall so that the ball-like mass 21 would be accelerating at the same speed as the case 36 of the sensing assembly and thus there would be no relative force between the ball-like mass 21 and the case 36 of the sensing assembly. As soon as this condition occurs, the ball-like mass 21 is free to move above within the cavity 17 and the ball would be attracted by the magnet 22 to a centermost position within the cavity 17 directly overlying the magnet 22 as shown in broken lines in FIG. 1 and would be retained in this position. In other words, as soon as the ball-like mass 21 and the case for the sensing assembly are in free fall, the force which was pushing or pulling the ball against the outer wall of the cylindrical cavity 17 now drops to zero relative to the case and the only forces which are exerted on the ball-like mass 21 are by the magnet 22 and, therefore, the ball-like mass 21 is immediately attracted to the center of the cylindrical cavity 17 into the closest proximity to the pickoff coil 26.

This reduces the oscillation of the oscillator 41 below a threshold level so that a signal is no longer supplied to detector 42 and the detector 42 no longer supplies a signal to the amplifier 43. As soon as this occurs, the amplifier produces an output which is supplied to the time delay unit 44. The time delay unit 44 operates on the principle of charging the capacitor C to a known high voltage which is the voltage at which the Zener diode Z will breakdown. As soon as this occurs, a signal is supplied to the amplifier 46 to produce an "arm" signal if hazardous power has been supplied to the amplifier 46 as hereinafter described.

The time delay 44 has been provided to prevent the sensing assembly from immediately switching to produce an "arm" signal when the ball-like mass 21 moves into the vicinity of the pickoff coil 26. This has been done since there is some possibility that oscillatory motion could be set up in the ball-like mass 21 during the time that the bomb is finding its final alignment with respect to the wind as it commences its trajectory which could set up oscillations in the bomb. Thus, the ball might pass rapidly back and forth through the acceptance region within the center of the cylindrical cavity 17. The time delay unit 44 requires that the ball-like mass 21 be within the center acceptance region of the cylindrical cavity for a predetermined period of time as, for example, a quarter of a second before any "arm" signal is produced by the sensing assembly.

The hazardous power could be supplied to the amplifier 46 within a predetermined period of time as, for example, three seconds after turnon of the amplifier 46, or alternatively, the hazardous power could be supplied to the entire unit within a predetermined period of time after launching of the bomb as, for example, within 3 seconds after launch.

A conventional procedure for the dropping of a bomb would be to have the aircraft 54 flying between leven and ±30° of level. At the moment of dropping the bomb, a lanyard or mechanical interlock would be pulled which would start the arming sequence of the bomb such that at the seconds later power would be applied to the sensor which, in turn, would produce an output on the bomb only if the bomb was in free fall. This three seconds gives the bomb time to orient itself with respect to the wind and so that its initial oscillations on release have died out. The bomb, therefore, should be in an almost equilibrium condition with respect to the air mass through which it is moving by the end of this period of time. In this condition, the bomb would see very little reaction force due to drag of the air mass through which it is moving. Thus, within three seconds after launch, the bomb would normally be aligned with the wind and there would be essentially no acceleration at right angles to the flight path which also would be at right angles to the longitudinal axis of the bomb, thus permitting the ball-like mass 21 to be immediately attracted to the center of the cavity 17 as hereinbefore described.

It can be seen that if the mechanical interlock or lanyard was pulled on a bomb while it was still under the wing of the aircraft, the bomb would not be armed because the ball-like mass 21 would be in its extreme outermost position and the sensing assembly would prevent the supplying of an arming signal to the bomb.

From the construction shown, it can be seen that the ball-like mass 21 has a diameter which is generally as great as the diameter of the pickoff coil 26. This is desirable so that the surface of the ball-like mass appears to be relative large to the pickoff coil and has characters similar to that of a plane so that it affects the pickoff coil 26 in much the same way as a planar paddle moving toward and away from the pickoff coil. The size of the ball-like mass 21 and the pickoff coil 26 have been designed in such a manner that there is an effective diameter or acceptance region within the cavity 17 which is greater in diameter than the diameter of the ball-like mass. This effective diameter is the diameter in which the ball-like mass 21 would be effective to reduce or stop oscillation of the oscillator 41.

This permits the ball-like mass to be slightly offcenter and still be effective to prevent oscillation of the oscillator 41. Thus, for example, with a pickoff coil having a diameter of one-eighth of an inch and with a ball having a diameter of one-half inch, the effective diameter could be three-fourth of an inch, which would mean that the ball could move one-eighth of an inch in either direction from the center and still produce the correct output from the sensing assembly.

This larger effective diameter or acceptance region is a desirable characteristic for the sensing assembly because this means that the sensing assembly can produce the desired output without having the ball-like mass in the exact center. Thus, when the ball-like mass is being attracted to the center position by the magnet, it is not necessary for it to assume its absolute final steady state position before the output electronics is actuated. If it were not for this larger effective diameter, it might require too much time as, for example, ten seconds for the ball-like mass to reach the steady state condition and produce an electrical output signal although this oscillatory motion could have been damped out by use of damping fluid within the cavity 17. The use of a larger acceptance region makes damping fluid unnecessary and permits acceptable operation over a large range of temperature as would be seen in a bomb, contrasted to the use of damping fluid which would unduly restrict the operating temperature range. This larger effective diameter thus makes it possible for the sensing assembly to produce an "arm" signal even though there may be a slight slewing motion or vibration of the bomb without use of damping fluid.

Since the ball-like mass 21 is relatively large with respect to the cavity 17 and also because the effective diameter is still larger than the ball-like mass 21, it can be seen that the range of acceptability includes a large portion of the cross-sectional area of the cylindrical cavity 17. Thus, the sensing assembly is a very effective "go" - "no-go" device. When the ball is in contact with the outer wall forming the cavity 17, the sensing assembly is in a "no-go" position, but when the ball jumps into the region opposite the magnet 22, the sensing assembly is in the "go" position. These conditions can be reversed merely by changing the phase of the output of the amplifier 43 by 180°.

Although it is possible to utilize a pickoff having a much smaller diameter than the ball-like mass, it appears that it is preferable that there be approximately a 1:1 ratio for the pickoff diameter and the diameter of the ball-like mass.

It can be seen that the sensing assembly hereinbefore described has many advantages. The sensing assembly has a noncontact, nonreacting pickoff which permits the ball-like mass to move freely within the cavity 17. No damping fluid is required and, therefore, the response of the sensing assembly is substantially independent of temperature. It also is insensitive to environments humidity, shock and vibration, because there are no contacts to be bent or corroded. The sensing assembly is very simple in operation and has very high reliability. All the undesirable characteristics of a mechanical switch are eliminated. The sensing assembly has only one moving part which is almost impossible to damage, making the sensing assembly substantially maintenance free.

Another embodiment of the invention is shown in FIG. 7 which can be characterized as a linear type. It consists of a housing 56 which is formed of two parts, 57 and 58, formed of the same material as the housing 11 of the embodiment of the invention shown in FIGS. 1-4. An inner cylindrical case 61 formed of two identical parts 62 and 63 are mounted in the housing 56. The parts 62 and 63 are provided with identical elongate recesses 64 and 66 which are in the form of a semicircle in cross section so that when the parts are fitted together they form an elongate cylindrical cavity 67. The cavity 67 is in the form of an elongate right circular cylinder having a diameter substantially less than its length. A ball-like mass 69 is disposed within the cavity 67 and has a diameter which is only slightly less than the diameter of the cavity 67. The length of the cavity permits translational movement of the ball-like mass back and forth within the cavity along an axis indicated by the arrows 71.

Means is provided for yieldably urging the ball-like mass 69 into a position which is equidistant between the ends of the cylindrical cavity 67 and consists of a permanent magnet 72 which is mounted in the part 57 of the housing 56. The pickoff coil, rather than being in the form of a pancake-type coil as in the previous embodiment, is in the form of an elongate solenoid coil 73 which is wrapped about the intermediate portion of the inner case 61. As can be seen, the coil 73 has a width which is substantially greater than the diameter of the ball-like mass 69 but which is substantially less than the length of the cavity 67. The parts 57 and 58 of the housing 56 are provided with recesses 76 to accommodate the coil. The coil 73 is connected to an electronics module 77 which has an output indicated at 78. The electronics module 77 has electronics similar to that described in connection with the previous embodiment.

The operation of the assembly shown in FIG. 7 may now be briefly described as follows. It can be seen that when the housing 56 is in a zero-G position with no acceleration acting on the same along the sensing axis 71, no translational forces are present to move the ball longitudinally of the cavity 67 and, therefore, the ball-like mass 69 will be attracted to the center of the cavity immediately underlying the permanent magnet 72 and within the pickoff coil 73. When the ball-like mass is in this position, oscillation of the oscillator is reduced or stopped and the electronics 77 will not produce an output 78. When the housing 56 is accelerated in either direction on the longitudinal axis as indicated by the arrows 71 and is sufficient to overcome the magnetic field created by the permanent magnet 72, the ball-like mass will move out from the pickoff coil against one of the end walls forming the cavity and the oscillator will commence oscillating to provide an output from the electronics 81. Thus, it can be seen that the assembly shown in FIG. 7 is in effect an open loop bidirectional (single axis) acceleration switch.

It should be appreciated that anyone skilled in the art of electronics would be able to reverse the output from the electronics 81 created by making the amplifier 43 noninverting and thus produce an output signal when the ball-like mass 69 is within the pickoff coil and not producing an output signal when the ball-like mass is outside of the pickoff coil.

As soon as there are no longer any acceleration forces exerted upon the ball-like mass 69, the centering magnet 72 will, in the absence of such forces, pull the ball-like mass back into the center of the cavity and into the pickoff coil. Thus, it can be seen that movement of the assembly shown in FIG. 7 to the right or left as viewed in FIG. 7 would produce an output signal. The acceleration switch is in effect a nonpolarity sensing acceleration switch.

A typical application for such an acceleration switch would be to disengage an erection loop for the vertical gyro of an aircraft during the time the aircraft was accelerating or decelerating.

With the sensing assembly shown in FIG. 7 mounted on the vertical gyro of an aircraft and having its sensing axis aligned with the longitudinal axis of the aircraft, such a sensing assembly would allow the erection system of the aircraft to continue only as long as the horizontal component of longitudinal acceleration did not exceed, for example, 0.1 of a G. Thus, upon takeoff or landing, the erection system would be disengaged and would make the gyro vertical reference much more reliable than if the erection system were permitted to continue in operation during periods of acceleration and deceleration. Since aircraft normally fly at a constant speed while in flight, this means that the ordinary fore and aft accelerations during flight are at the lowest which are normally encountered and thus a sensing assembly would be inactive during substantially all the period that the aircraft is in conventional flight, i.e., not appreciably accelerating or decelerating. Since the sensing assembly is only sensitive along one axis, this would permit the aircraft to accelerate in other directions without affecting the sensing assembly. Thus, the aircraft could move rapidly up and down, or laterally, or sideways during turns. The sensing assembly would only be effective during the time the aircraft is picking up speed to reach cruising speed and during the time it is dropping speed from the cruising speed to slow down for landing. However, it is during these critical times of takeoff and landing that the knowledge of vertical is very significant. The bidirectional switch will allow the gyro to be more accurate by disengaging the erection loop for the vertical gyro during the periods of relatively high acceleration.

Still another embodiment of the invention is shown in FIG. 8. It consists of a housing 81 of a nonmagnetic material. The housing is formed of an upper part 82 and a lower part 83. The lower part 83 is formed with a cavity 84 which is defined by a cylindrical sidewall 86 which adjoins a concave spherical bottom surface 87. The upper part 82 has a convex spherical surface 88 which is complementary with the concave surface 87 so that there is a uniform spacing between the same. A ball-like mass 89 of any type of conducting material is disposed within the cavity 84 and has a diameter which is only slightly less than the spacing between the surfaces 87 and 88.

Means is provided for yieldably urging the mass 89 to a central position within the cavity 84. However, in this case, the force consists of the force of gravity which, because of the concave spherical surface 87, will roll to the center automatically when the housing 81 is level, i.e., when the plane formed by the upper extremity of the concave surface is in a horizontal position. The force of gravity also is a force caused by acceleration.

Pickoff means is provided for sensing when the ball-like mass 89 is in the central position and consists of a pickoff block 91 which carries a pancake type pickoff coil 92. The pickoff block 91 is mounted within the lower part 83 in such a manner that the pickoff coil is disposed immediately below the center of the concave surface 87. The pickoff coil 92 is connected to an electronics module 96 substantially identical to the electronics module 81 and is provided with an output indicated at 97.

Operation of the sensing assembly shown in FIG. 8 may now be briefly described as follows. Let it be assumed that the assembly has been mounted in a bomb 98 indicated in broken lines in such a manner that the axis of symmetry of the concave surface 87 is parallel to the longitudinal axis of the bomb. When the bomb is in a horizontal position, the ball would be adjacent the cylindrical sidewall 86 and away from the pickoff coil and thus would operate in much the same manner as the embodiment shown in FIG. 1. When the bomb is in free fall, the only force which would be exerted upon the ball-like mass 89 would be the drag deceleration which would cause the ball-like mass to center itself on the concave surface 87. However, since this drag deceleration or acceleration would be very much less than the force of gravity, the ball-like mass would have a tendency to move very slowly back and forth trying to find its way to the center point of the spherical surface. Thus, it would be unsuitable for such an application if a short response time were required. It is for this reason that the magnetic means was provided in the embodiment shown in FIG. 1 to bring the ball-like mass to a center position within a relatively short period of time as, for example, within 3 seconds.

The sensing assembly shown in FIG. 8 is particularly adaptable for use in other applications. For example, it can be utilized as a tilt sensor to tell when a platform or other vehicle is out of level. Such information may be desired as, for example, with respect to a gyro platform which serves as a reference for a radar antenna. It can be seen that when the housing 81 is mounted on a platform, that as soon as the platform is out of level, the ball 89 will roll away from the center position and away from the pickoff coil which will cause the pickoff coil to sense this condition and to actuate the electronics to provide a signal indicating that the platform is out of level.

It is apparent from the foregoing that the sensing assembly hereinbefore described has many applications. In addition, it is relatively simple and is economical to manufacture. Also, since it has only one moving part, it would practically maintenance free.

I claim:

1. In a sensing assembly, a housing, said housing having a cavity formed therein defined by wall-like surfaces, a movable mass having a circular surface disposed in the cavity and being capable of rolling freely back and forth in said cavity in at least one direction on at least one of said wall-like surfaces, means normally yieldably urging said mass into a predetermined position in the cavity in said housing and electronic means free of physical contact with said mass and exclusive of said wall-like surfaces for sensing the position of said mass in said cavity, said mass and said electronic means having characteristics such that there is an acceptance region within the cavity generally centrally disposed within the cavity into which and out of which the mass can move whereby said electronic means can only give one type of signal when said mass is out of said acceptance region and can only give another type of signal when said mass is within said acceptance region.

2. A sensing assembly as in claim 1 wherein said means for normally yieldably urging said mass into a predetermined position in the cavity in said housing is a force caused by acceleration.

3. A sensing assembly as in claim 1 wherein said mass is formed of a material having magnetic properties and wherein said means normally yieldably urging said mass into a predetermined position includes magnetic means carried by the housing.

4. A sensing assembly as in claim 1 wherein said cavity is in the form of a right circular cylinder which has a length which is less than its diameter.

5. A sensing assembly as in claim 1 wherein said cavity is in the form of a right circular cylinder having a length which is greater than its diameter and wherein said mass is ball-like and has a diameter which is substantially less than the diameter of the cavity.

6. A sensing assembly as in claim 1 wherein said cavity is in the form of a right circular cylinder having a length substantially less than its diameter and wherein said mass has a ball-like shape and has a diameter which is only slightly less than the diameter of the cavity.

7. A sensing assembly as in claim 1 wherein said wall-like surfaces include a concave spherical surface lying in a generally horizontal plane and wherein said mass is ball-like in shape and adapted to roll upon said surface.

8. A sensing assembly as in claim 1 wherein said mass has a ball-like shape and wherein said cavity is formed by a pair of spaced complementary concave and convex spherical surfaces having a spacing between the same which is only slightly greater than the diameter of the ball-like mass, said ball-like mass being adapted to travel upon the concave surface.

9. A sensing assembly as in claim 1 together with time delay means for preventing said another type of signal from being effective until a predetermined period of time has elapsed.

10. A sensing assembly as in claim 1 wherein said means for sensing the position of said mass in said cavity includes a coil in the vicinity of said cavity.

11. A sensing assembly as in claim 10 wherein said coil is generally planar.

12. A sensing assembly as in claim 10 wherein said coil is in the form of a cylinder through which the mass is adapted to travel.

13. In a sensing assembly for use in connection with a safe arm device in an object to be dropped in space, a housing, means within the housing forming a cavity in the form of a right cylinder, the cylinder having a diameter substantially greater than its length, a free-rolling ball-like mass formed of a material having magnetic properties disposed within the cavity and having a diameter substantially as great as the length of the cavity, magnetic means disposed in the housing and generally coincident with the axis of the cavity for applying forces to the ball-like mass to yieldably urge the ball-like mass into a central position within the cavity, pickoff means exclusive of said means forming said cavity free of physical contact with said mass carried by the housing and disposed in the vicinity of the cavity and generally in axial alignment with the axis of the cavity, said assembly being adapted to be arranged so that the axis of the cavity is substantially parallel to the longitudinal axis of the bomb so that when the bomb is in a horizontal position, the ball-like mass will be pulled to the outer side of the cavity by the force of gravity and so that when the bomb is in free fall, the ball-like mass will be pulled back to the center of the cavity by the force of the magnetic means, and electronic means carried by the housing connected to the pickoff coil for supplying a signal of one type only when said ball-like mass is generally in said central position and another type of signal when said ball-like mass is out of said generally central position.

14. A sensing assembly as in claim 13 wherein said magnetic means is in the form of permanent magnet and wherein said housing is formed of a nonmagnetic material.

15. A sensing assembly as in claim 13 wherein said pickoff coil is in the form of a coil which is wound about the midpoint of the cavity.

* * * * *